United States Patent [19]
Disam et al.

[11] Patent Number: 5,934,700
[45] Date of Patent: *Aug. 10, 1999

[54] GAS BAG RESTRAINT MODULE

[75] Inventors: Wolfgang Disam, Durlangen; Joachim Lutz, Schechingen, both of Germany

[73] Assignee: TRW Occupant Restraint Systems GmbH, Alfdorf, Germany

[ * ] Notice: This patent is subject to a terminal disclaimer.

[21] Appl. No.: 08/812,877

[22] Filed: Mar. 6, 1997

[30] Foreign Application Priority Data

Mar. 8, 1996 [DE] Germany ........................ 296 04 345 U

[51] Int. Cl.$^6$ .................................................. B60R 21/16
[52] U.S. Cl. ........................................ 280/728.2; 280/732
[58] Field of Search ................................ 280/728.2, 732, 280/740, 728.1, 743.1, 741

[56] References Cited

U.S. PATENT DOCUMENTS

| | | |
|---|---|---|
| 4,964,654 | 10/1990 | Bishop et al. . |
| 5,069,480 | 12/1991 | Good . |
| 5,149,130 | 9/1992 | Wooley et al. . |
| 5,263,739 | 11/1993 | Webber et al. . |
| 5,490,690 | 2/1996 | Mihm ................................... 280/728.2 |
| 5,558,362 | 9/1996 | Acker et al. . |
| 5,564,732 | 10/1996 | Bauer et al. ......................... 280/728.3 |
| 5,611,562 | 3/1997 | Kelley et al. ......................... 280/728.2 |
| 5,775,730 | 7/1998 | Pripps et al. ............................ 280/740 |

FOREIGN PATENT DOCUMENTS

| | | |
|---|---|---|
| 0558240 | 9/1993 | European Pat. Off. . |
| 0609959 | 8/1994 | European Pat. Off. . |
| 0620139 | 10/1994 | European Pat. Off. . |
| 0680851 | 11/1995 | European Pat. Off. . |
| 29604345 | 7/1996 | Germany . |
| 50131742 | 10/1975 | Japan . |
| 4201760 | 7/1992 | Japan . |
| 542856 | 2/1993 | Japan . |
| 616103 | 1/1994 | Japan . |
| 623845 | 3/1994 | Japan . |
| 6156177 | 6/1994 | Japan . |
| 6191363 | 7/1994 | Japan . |
| 6321040 | 11/1994 | Japan . |
| 3014625 | 6/1995 | Japan . |
| 3016418 | 7/1995 | Japan . |
| 3018670 | 9/1995 | Japan . |
| 3020086 | 10/1995 | Japan . |
| 3021769 | 12/1995 | Japan . |
| 858521 | 3/1996 | Japan . |
| 9425313 | 11/1994 | WIPO . |

Primary Examiner—Christopher P. Ellis
Attorney, Agent, or Firm—Tarolli, Sundheim, Covell, Tummino & Szabo

[57] ABSTRACT

A gas bag restraint module is disclosed. According to a first embodiment, the gas bag restraint module comprises a housing having a generally cylindrical accommodation part and two axially extending attachment strips running outwards from the accommodation part. The gas bag restraint module further comprises a bottle-shaped pressurized gas container axially inserted into the accommodation part. The pressurized gas container provides a volume of pressurized gas after activation. Still further, the gas bag restraint module comprises a folded gas bag adapted to be inflated by pressurized gas provided by the pressurized gas container. The gas bag comprises an inflation opening surrounded by an attachment section. The attachment section is provided with an attachment frame comprising at least one through opening which is in fluid communication with the inflation opening. The attachment frame is accommodated between the attachment strips and is fixed at the accommodation part. A second embodiment differs from the first embodiment in that the housing comprises a generally trough-shaped accommodation part, and in that the pressurized gas container is inserted into the accommodation part.

25 Claims, 13 Drawing Sheets

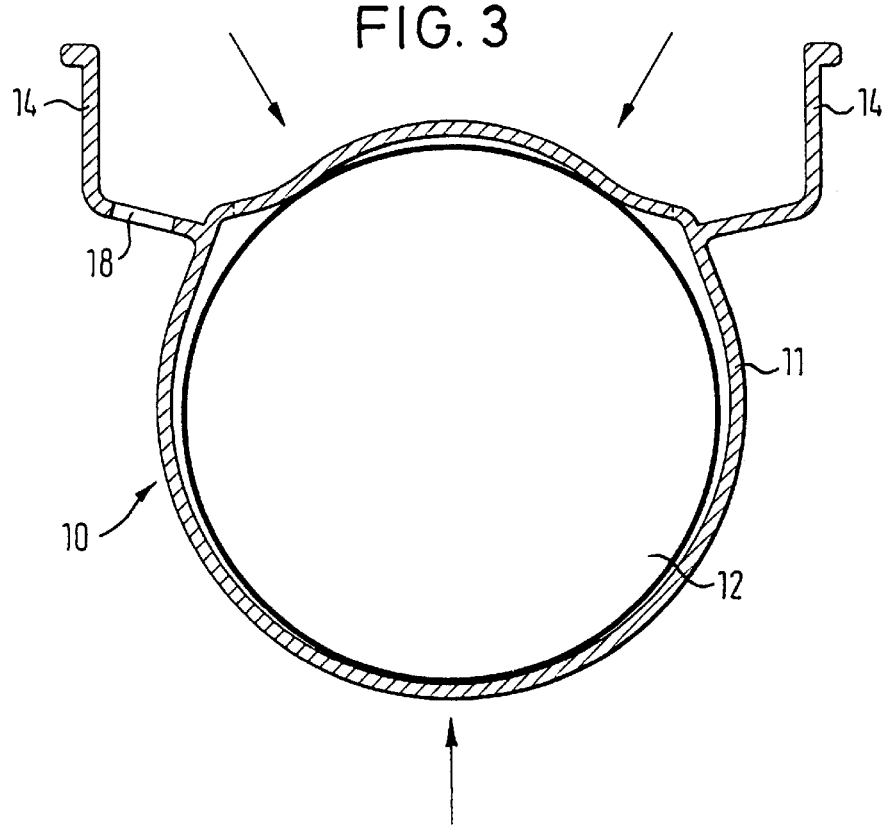
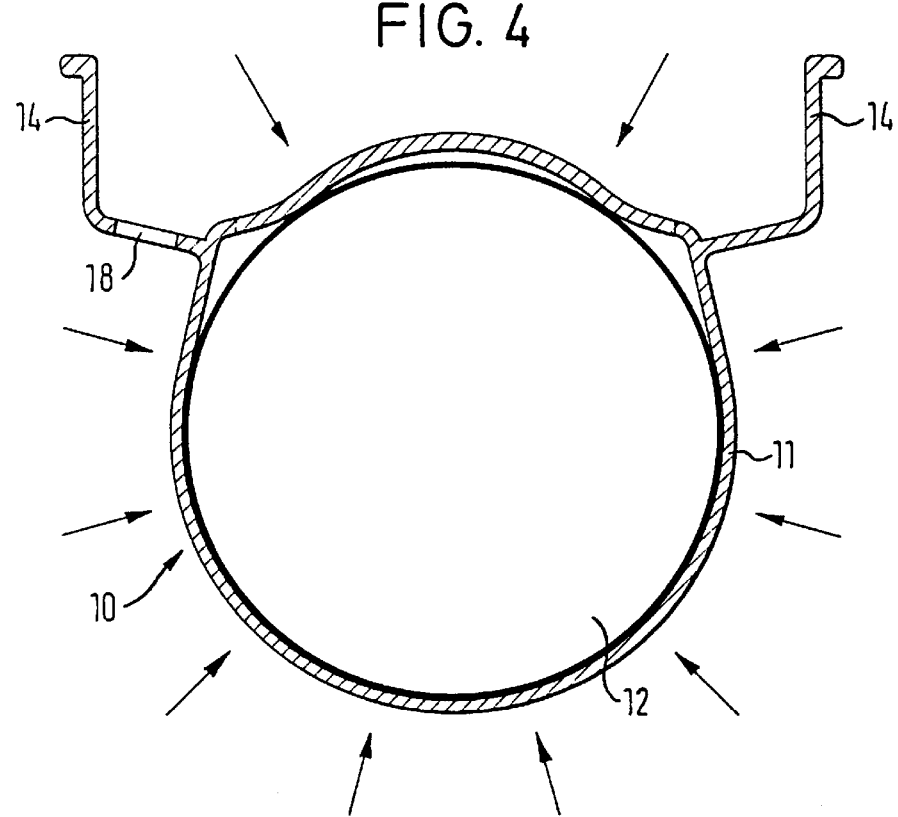

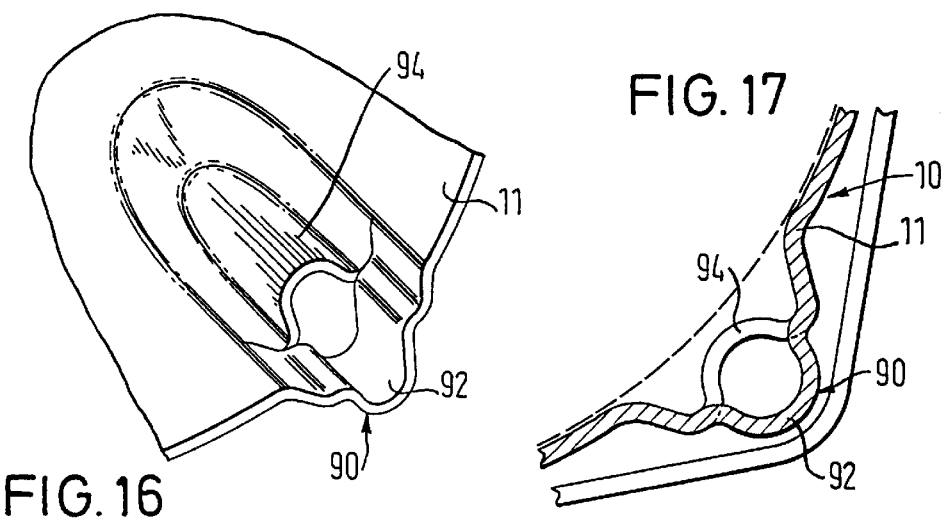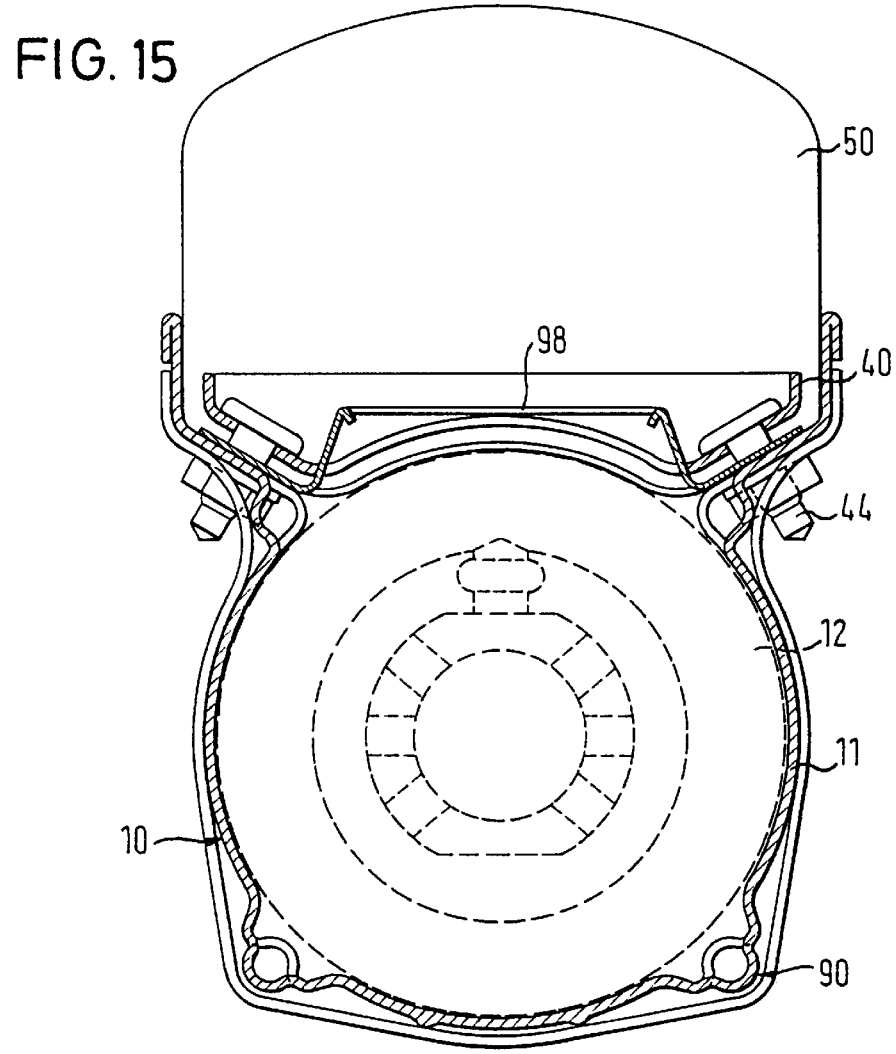

GAS BAG RESTRAINT MODULE

TECHNICAL FIELD

The invention relates to a gas bag restraint module as is arranged in a motor vehicle for providing a restraint effect for a vehicle occupant in case of an accident.

BACKGROUND OF THE INVENTION

Such gas bag restraint modules are known to the expert involved with vehicle passenger safety systems. Normally, a so-called gas generator having a pyrotechnical charge is used as the inflator, said pyrotechnical charge releasing a predetermined volume of gas in a very short time once activated. Recently, however, increased efforts have been made to develop gas bag restraint modules which operate with a much smaller pyrotechnical charge because the use of such pyrotechnical charges is not without problems, particularly in respect of environmental compatibility. The invention provides a gas bag restraint module of the type mentioned at the outset, which is adapted to use an inflator which has a pressurized gas container, in particular of the "heated gas inflator" type. With this type of inflator, a predetermined volume of gas is released to inflate the gas bag, said gas having been enclosed under high pressure in the pressurized gas cylinder. Upon activation of the inflator, a chemical reaction with the gas contained in the pressurized gas container is also initiated, whereby the temperature of the released gas is increased, thus leading to a corresponding increase in its volume.

BRIEF SUMMARY OF THE INVENTION

The present invention provided a gas bag restraint module which is distinguised by particularly small dimensions. According to a first embodiment of the invention, the gas bag restraint module comprises a housing having a generally cylindrical accommodation part and two axially extending attachment strips running outwards from the accommodation part. The gas bag restraint module further comprises a bottle-shaped pressurized gas container axially inserted into the accommodation part. The pressurized gas container provides a volume of pressurized gas after activation. Still further, the gas bag restraint module comprises a folded gas bag adapted to be inflated by pressurized gas provided by the pressurized gas container. The gas bag comprises an inflation opening surrounded by an attachment section. The attachment section is provided with an attachment frame comprising at least one through opening which is in fluid communication with the inflation opening. The attachment frame is accommodated between the attachment strips and is fixed at the accommodation part. A second embodiment of the invention differs from the first embodiment in that the housing comprises a generally trough-shaped accommodation part, and in that the pressurized gas container is inserted into the accommodation part. The design of this gas bag restraint module creates the conditions for a particularly easy and safe assembly of the pressurized gas container.

Provision is preferably made for the housing with the pressurized gas container, on the one hand, and the attachment frame with the folded gas bag, on the other hand, to form two preassembled assemblies. The division of the gas bag restraint module into two assemblies which can be preassembled separately results in further advantages for assembly.

Advantageous arrangements of the invention are given in the subclaims.

BRIEF DESCRIPTION OF THE DRAWINGS

The invention is described in the following, reference being made to two embodiments which are illustrated in the enclosed drawing:

FIG. 3 shows a schematic cross-section along the line III—III of FIG. 1, which shows a first variant of the housing;

FIG. 4 shows a schematic cross-section along the line III—III of FIG. 1, which shows a second variant of the housing;

FIG. 15 shows a schematic cross-section through a gas bag restraint module according to the second embodiment with a housing in accordance with a second variant;

FIG. 16 shows an enlarged perspective view of a detail of the housing shown in FIG. 15;

FIG. 17 shows a front view of the detail shown in FIG. 16;

DETAILED DESCRIPTION OF THE PREFERRED EMBODIMENTS

Figure 1:
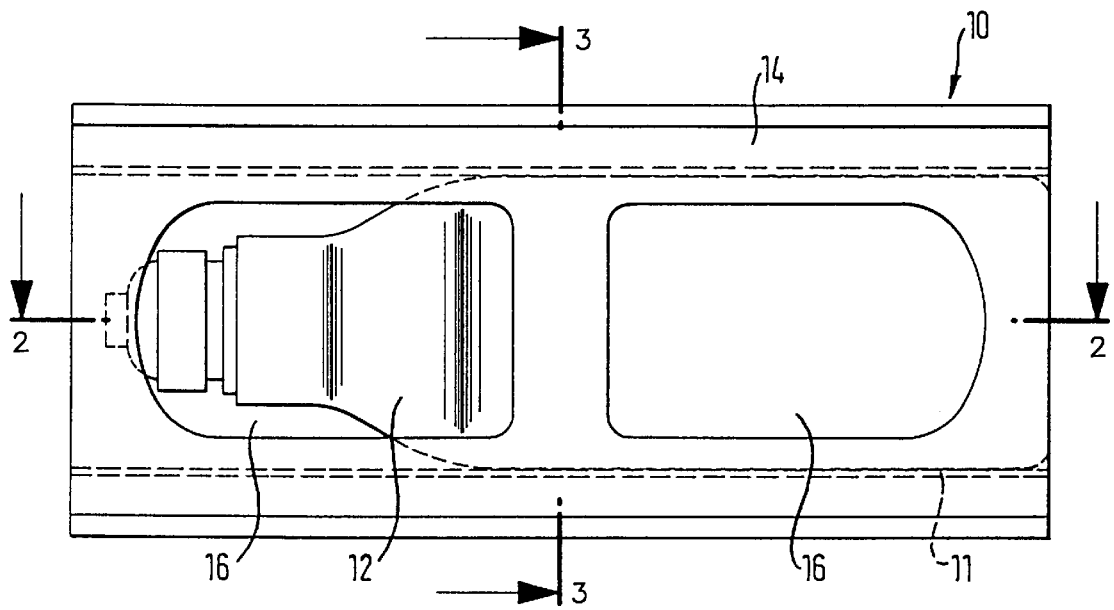
FIG. 1 shows a schematic top view of a housing with inserted pressurized gas container in accordance with the first embodiment of the gas bag restraint module according to the invention.
Figure 2:
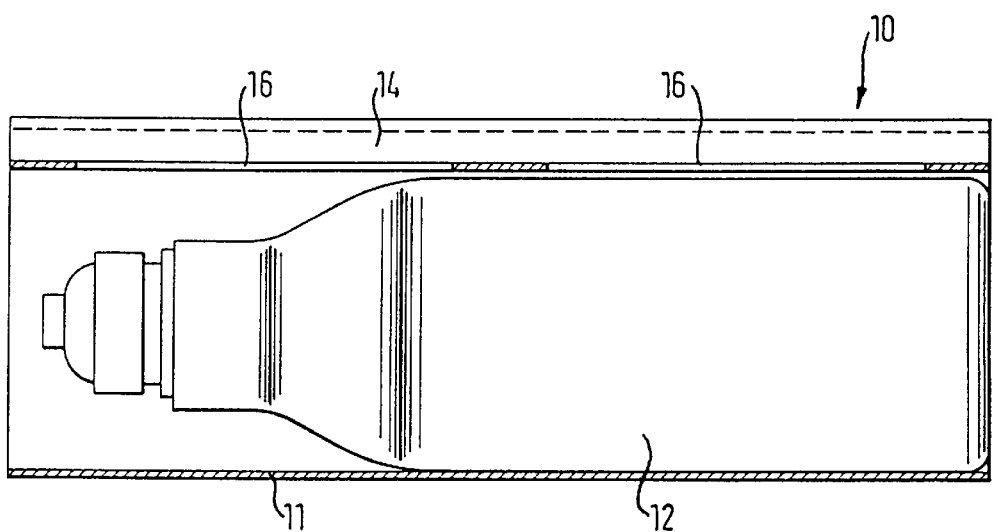
FIG. 2 shows a schematic cross-section along the line II—II of FIG. 1.

The gas bag restraint module according to the invention consists of two separately preassembled assemblies, of which the first is the housing with the pressurized gas container and the second is the gas bag with its attachment frame.

FIGS. 1 to 11 schematically depict a first embodiment of a housing 10 of a gas bag restraint module according to the invention. This housing 10 has a generally cylindrical accommodation part 11 into which the pressurized gas container 12 is axially inserted, as well as two attachment strips 14 which run outwards in an axial direction, starting from the accommodation part 11. Two through passages 16 are formed in the accommodation part 11, between the attachment strips 14. As can be seen from FIGS. 3 and 4, each attachment strip 14 is double-folded so that between the sections of the attachment strips 14 projecting perpendicularly upwards in FIGS. 3 and 4, an accommodation area is formed. Several attachment holes 18 are formed in the section of the attachment strips 14 located adjacent to the accommodation part 11.

The pressurized gas cylinder 12 contains gas under pressure, which, following ignition using an auxiliary pyrotechnical charge to activate the gas bag restraint module, flows out of the latter close to the head. Furthermore, upon activation a chemical reaction with the pressurized gas is initiated, said reaction increasing the temperature of the released gas, thus leading to an increase in its volume.

The pressurized gas cylinder 12 is held in the accommodation part 11 by a press fit. To obtain this press fit, two variants are preferred, of which the first is shown in FIG. 3. According to this variant of the housing 10, the accommodation part 11 has a polygonal cross-section, so that the press fit is formed between the sections of the accommodation part 11 with the smallest radial distance from the mid-longitudinal axis and the wall of the pressurized gas cylinder. The contact points between the accommodation part 11 and the pressurized gas cylinder 12 are indicated by arrows.

FIG. 4 shows a second variant of the configuration of the housing 10. According to this example, the accommodation part 11 has an essentially circular cross-section, so that there is contact between the wall of the accommodation part 11 and the wall of the pressurized gas cylinder 12 along a large surface area of the pressurized gas cylinder 12. In this figure too, the areas of contact between the accommodation part 11 and the pressurized gas cylinder 12 are marked by arrows.

In the two variants of the accommodation part 11 shown in FIGS. 3 and 4, the dimensions of the latter are adapted to the dimensions of the pressurized gas cylinder 12 in such a way that for assembly in the accommodation part 11, the pressurized gas cylinder 12 is inserted by force into the inside of the accommodation part 11. This insertion preferably starts with the head end of the pressurized gas cylinder 12, so that the smooth transition between the head of the pressurized gas cylinder and its casing surface facilitates the start of insertion. The press fit produced during assembly of the pressurized gas cylinder 12 guarantees a firm fit of the pressurized gas cylinder 12 in the accommodation part 11, without further means being necessary to secure the pressurized gas cylinder 12. Once the pressurized gas cylinder 12 is incorporated into the housing 10, the first assembly is preassembled.

Figure 5:
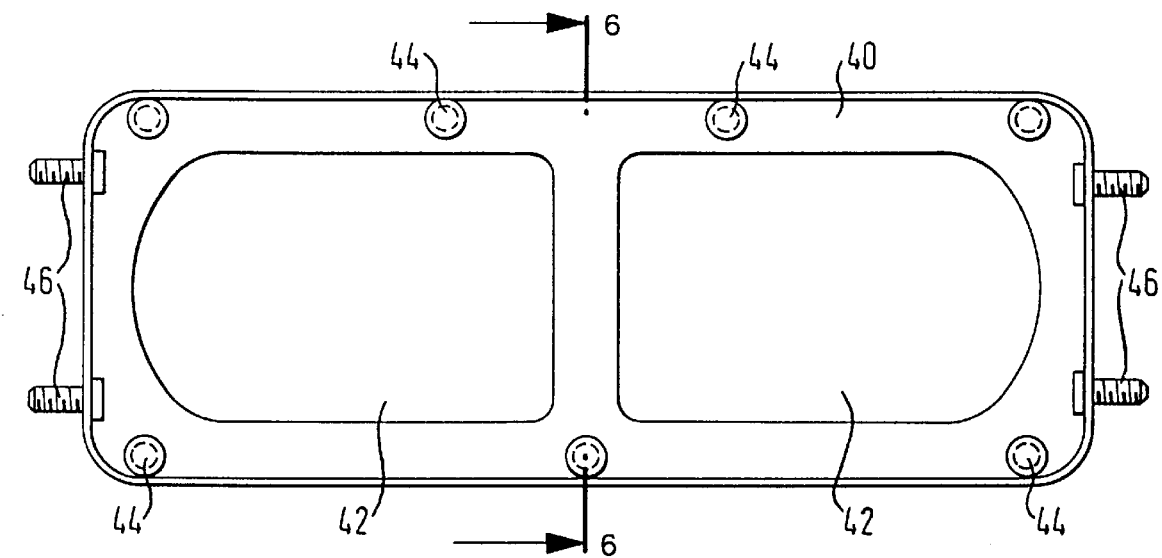
FIG. 5 shows a schematic top view of the attachment frame.
Figure 6:
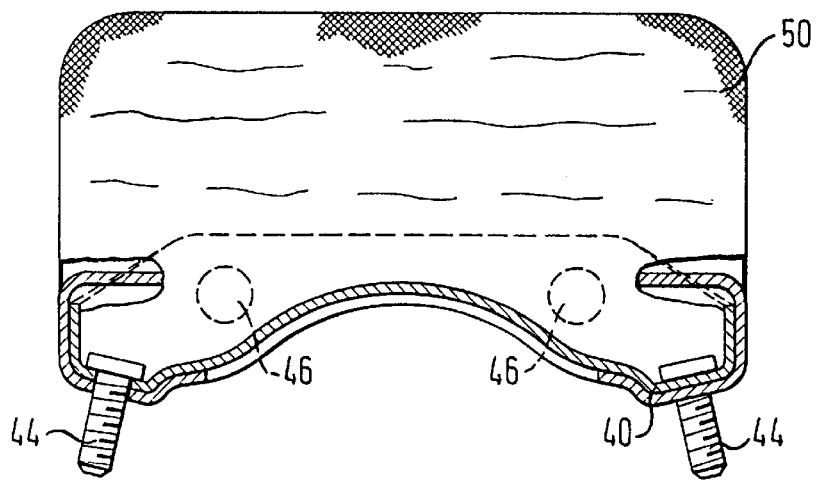
FIG. 6 shows a schematic cross-section through the gas bag provided with the attachment section.

FIG. 5 schematically depicts an attachment frame 40, which is provided for attaching a gas bag 50 to the housing 10. The attachment frame 40 has a generally rectangular shape and is provided with two through passages 42 along its longitudinal centre line. Along the peripheral edge of the attachment frame 40 are attachment bolts 44 and 46, of which some, namely the bolts 44, are arranged perpendicularly to the plane of projection of FIG. 5, whilst others, namely the bolts 46, are arranged in the plane of projection of this figure. The attachment frame 40 together with the attachment bolt 44 or 46 is inserted into the inside of the gas bag 50 in such a way that the attachment bolts extend through openings in the gas bag, said openings being formed in an attachment section surrounding an inflation aperture of the gas bag 50. In this way, the attachment frame 40 is fixed precisely in relation to the gas bag 50. The gas bag 50 is then folded over the attachment frame 40 in such a way that it takes on a compact form and does not significantly protrude laterally beyond the outer edge of the attachment frame 40. In this folded state, the gas bag 50 is fixed in such a way that it cannot become unfolded again during further handling of the assembly consisting of it and the attachment frame 40. FIG. 6 shows a cross-section through a folded gas bag 50 and the relevant attachment frame 40.

Figure 7:
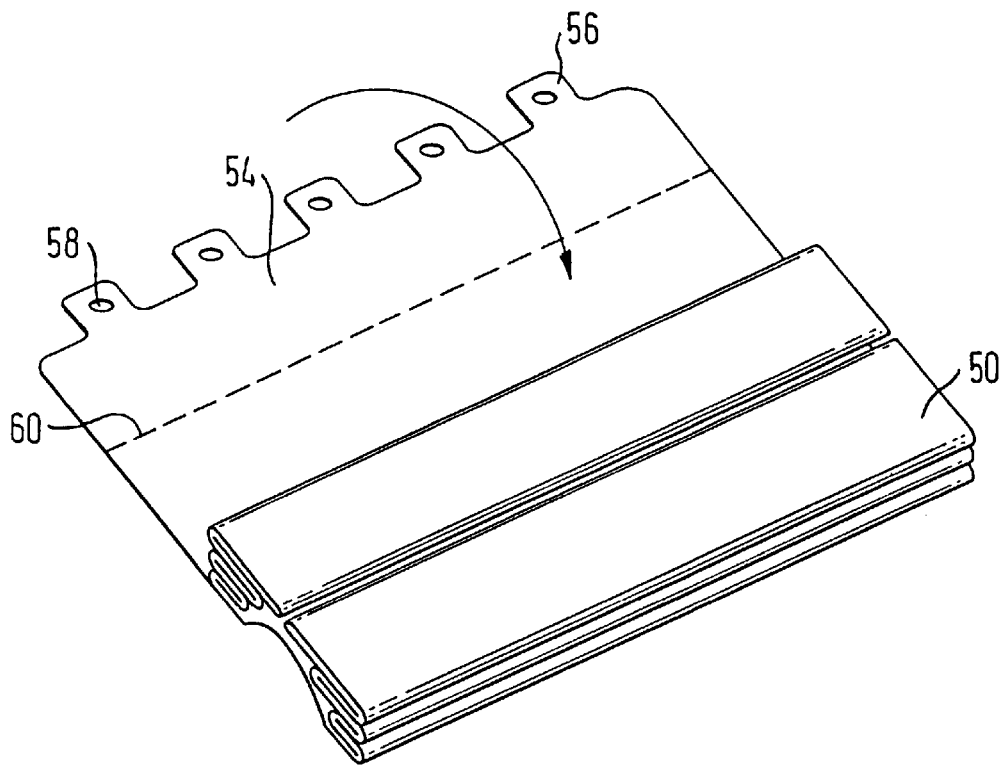
FIG. 7 shows a perspective view of a folded gas bag in accordance with a first variant.
Figure 8:
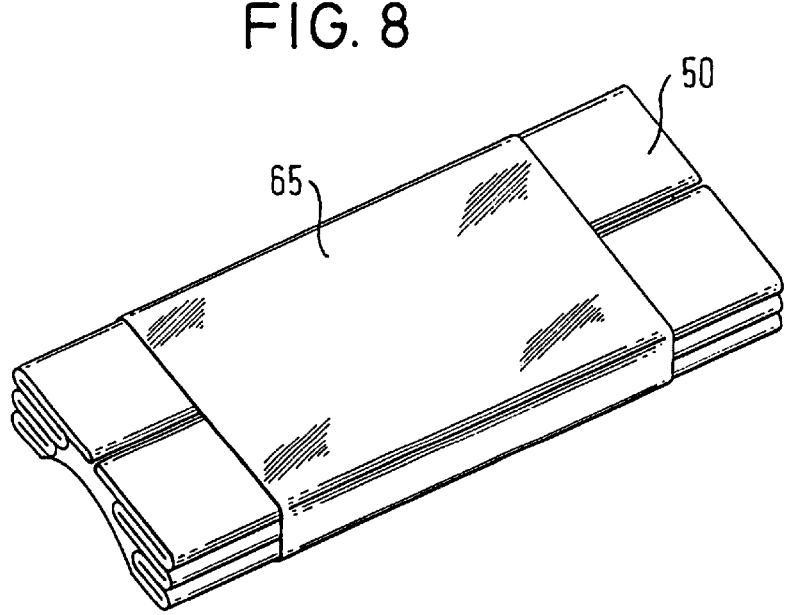
FIG. 8 shows a perspective view of a folded gas bag in accordance with a second variant.

FIGS. 7 and 8 depict two variants for fixing the gas bag in the folded form. For the variant shown in FIG. 7, the gas bag 50 has a rectangular fixing part 54, one long side of which is permanently connected to the gas bag 50; preferably, it is sewn onto the gas bag 50. The other long side of the fixing part 54 is provided with projections 56 in which openings 58 are located. The middle section of the fixing part 54 located between the two long sides has a perforation line 60. When the gas bag is folded in the required, compact form, the fixing part is folded over the gas bag and the openings 58 of the projection 56 are suspended on the attachment bolts 44, so that the gas bag 50 is fixed. The perforation 60 provides a tear-off line, along which the fixing part 54 tears upon activation of the gas bag restraint module, releasing the gas bag. If the gas bag 50 is fixed in this way, the assembly, consisting of the gas bag and the attachment frame 40, can be handled without difficulty, particularly for mounting on the preassembled housing 10.

In the case of the variant shown in FIG. 8, the gas bag 50 is kept in the folded, compact state in a banderole 65 known to the expert. This banderole 65 can be made from a plastic material or any other suitable material, for example textile fabric.

Figure 9:
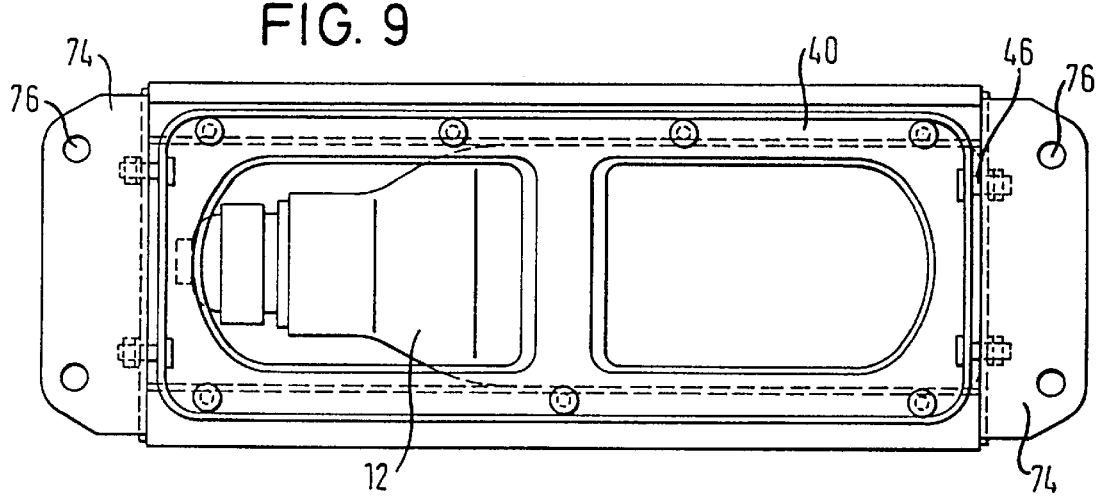
FIG. 9 shows a schematic top view of the first embodiment of the housing, in which the pressurized gas container is located and on which the attachment frame without gas bag is assembled.
Figure 10:
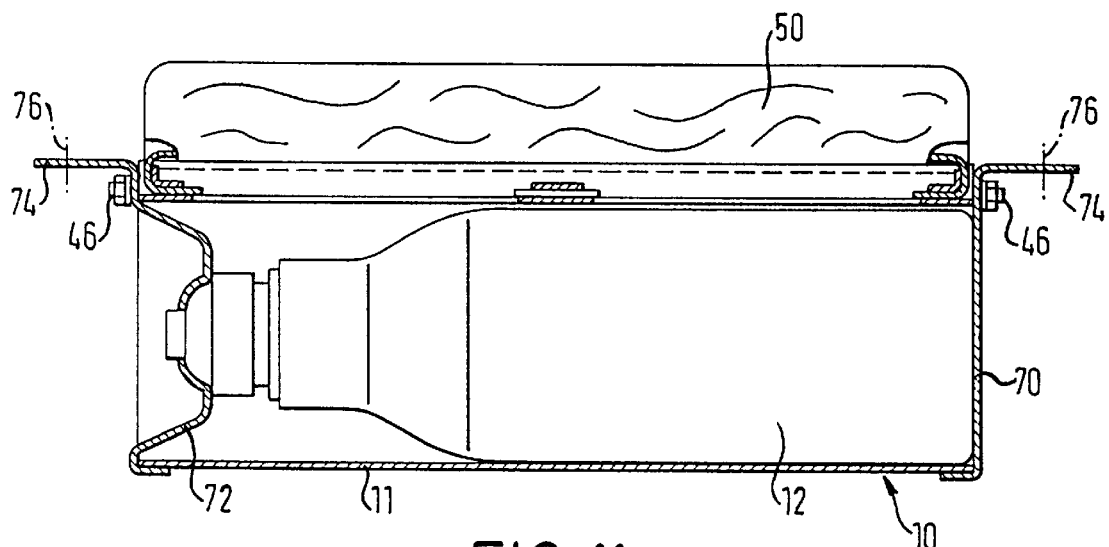
FIG. 10 shows a schematic longitudinal section through the assembled gas bag restraint module according to the first embodiment.
Figure 11:
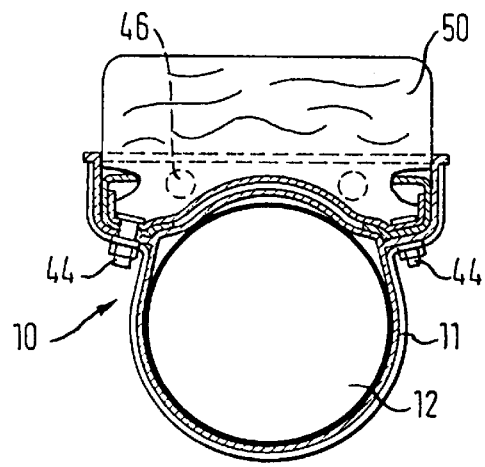
FIG. 11 shows a schematic cross-section through the assembled gas bag restraint module according to the first embodiment.

Finally, the gas bag restraint module according to the invention is shown in FIGS. 9 to 11, in accordance with the first embodiment, according to which the assembly consisting of the housing 10 and the pressurized gas cylinder 12 is connected to the assembly consisting of the gas bag 50 and the attachment frame 40. The attachment frame 40, together with the gas bag 50, is placed on the housing 10 in such a way that the attachment bolts 44 protrude through the openings 18, which are located in the attachment strips 14. A nut is screwed onto each of the free ends of the attachment bolts 44. The end of the accommodation part 11 facing the bottom of the pressurized gas cylinder 12 is sealed by means of a base plate 70, which is provided with openings through which the attachment bolts 46 protrude. The end of the accommodation part 11 facing the head of the pressurized gas cylinder 12 is sealed by means of a retaining plate 72, which is also provided with openings, through which the attachment bolts 46 protrude. A nut is screwed onto each of the free ends of the attachment bolts 46, said nuts preferably being of the same type as the nuts which are screwed onto the attachment bolts 44. Alternatively, retaining nuts pressed into the attachment frame can be used, with attachment bolts being screwed into them from outside. The retaining plate 72 is provided with a retaining section, which is adapted to the shape of the head. The retaining section also has an opening, into which a lug on the head of the pressurized gas cylinder 12 engages. This is particularly noticeable in FIG. 10. The base plate 70 and the retaining plate 72 are each provided with a flange 74, which has drilled holes 76, which are provided for attaching the gas bag restraint module in a vehicle.

The configuration of the gas bag restraint module according to the invention results in various advantages with regard to the manufacture and assembly of the individual components. The housing 10 is preferably manufactured from an extruded section. This makes manufacture particularly straightforward, because, apart from forming the drilled holes 18 in the attachment strips 14 and trimming the extruded section to the required length, no machining is required. The press fit between the accommodation part 11 and the pressurized gas cylinder 12 means that the latter is held in the housing 10 in a particularly straightforward way. Although in fact no additional means are required to hold the pressurized gas cylinder 12 in place, the base plate 70 and the retaining plate 72 do enhance the security of the hold on the pressurized gas cylinder 12. Furthermore, if no external sealing of the housing 10 is provided for, the base plate 70 and the retaining plate 72 act as seals for the housing 10, forming an enclosed space into which the pressurized gas from the pressurized gas source 12 can flow. The attachment bolts 44 and 46 fitted to the attachment frame 40 are used to fit the gas bag 50 as well as to attach the attachment frame 40 to the housing 10 and to attach the base plate 70 and the retaining plate 72. Finally, the gas bag restraint module according to the invention can be preassembled in two separate assemblies, which are particularly easy to handle without the need for additional securing devices during handling.

FIGS. 12 to 25 show a schematic illustration of a second embodiment of an gas bag restraint module according to the invention. This differs essentially from the first embodiment only to the extent that the accommodation part 11 is trough-shaped and open in the direction of the gas bag and to the front side, so that the through passage 16 extends along the entire length of the housing 10. To the extent that components of the gas bag restraint module in accordance with the second embodiment correspond to components known from the gas bag restraint module in accordance with the first embodiment, the same reference characters are used, and with regard to the description of these structural elements, reference is made to the notes on FIGS. 1 to 11.

Figure 12:
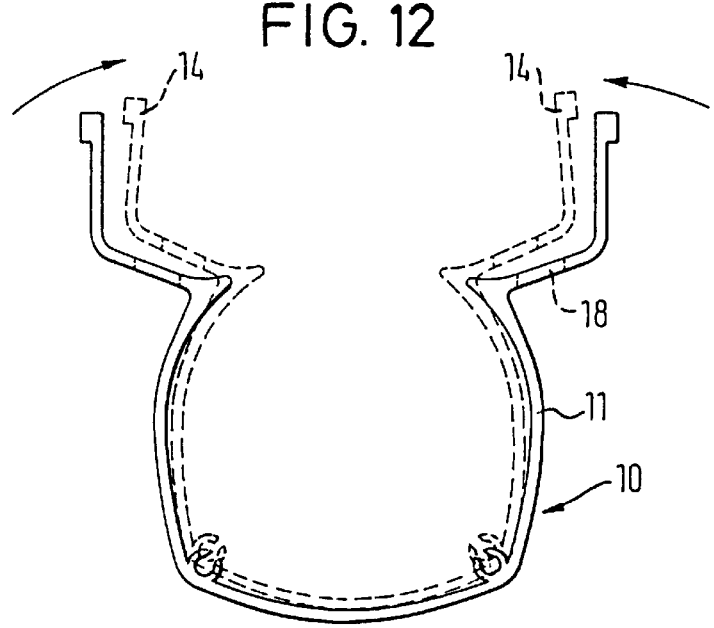
FIG. 12 shows a schematic cross-section through a first variant of the housing of a gas bag restraint module according to the second embodiment.

Due to the trough-shaped design of the accommodation part 11, the housing is elastic, so that the two legs attached to the attachment strips 14 can move in relation to each other. The dimensions of the pressurized gas cylinder 12 and of the accommodation part 11 are so adapted to one another that the pressurized gas cylinder can easily be inserted into the accommodation part 11 when the attachment strips are moved from their initial positions, which are depicted in FIG. 12 as dotted lines. Once the pressurized gas cylinder 12 is introduced into the accommodation part 11, the attachment strips 14 are released again, and because of the elasticity of the material of the housing 10, they try to revert to their initial positions. This is shown by arrows in FIG. 12. The outer diameter of the pressurized gas cylinder 12 is larger than the internal diameter of the accommodation part 11 in the initial position, so that the pressurized gas cylinder 12 is firmly held in the accommodation part 11 because of the resulting initial stress. The first assembly is now complete.

The second assembly, the configuration of which does not differ from the configuration described above, can now be placed on the first assembly. Attachment of the two assemblies to each other only differs from the description given above to the extent that, because of the dimensions of the two assemblies relative to each other, when the second assembly is bolted to the first assembly, a clamping force is generated which attempts to bring the two attachment strips 14 closer to the initial position. This brings about a clamping effect on the pressurized gas cylinder, which is symbolised by the three arrows in FIG. 13. The second assembly interacts with the first assembly like a pipe clip, in the inside of which the pressurized gas cylinder 12 is clamped. Due to the polygonal cross-section of the accommodation part 11 and the shape of the attachment frame 40, this does not exert any direct pressure on the pressurized gas source. Depending on the required type of clamping system between accommodation part 11 and the pressurized gas cylinder 12, a polygonal section can be selected for the accommodation part 11, so that the attachment frame 40 touches the pressurized gas source 12 and, together with the accommodation part 11, holds this firm, or a circular section, so that a large-area clamping effect is achieved between the accommodation part 11 and the attachment frame 40, on the one hand, and the pressurized gas source 12 on the other hand.

Figure 13:
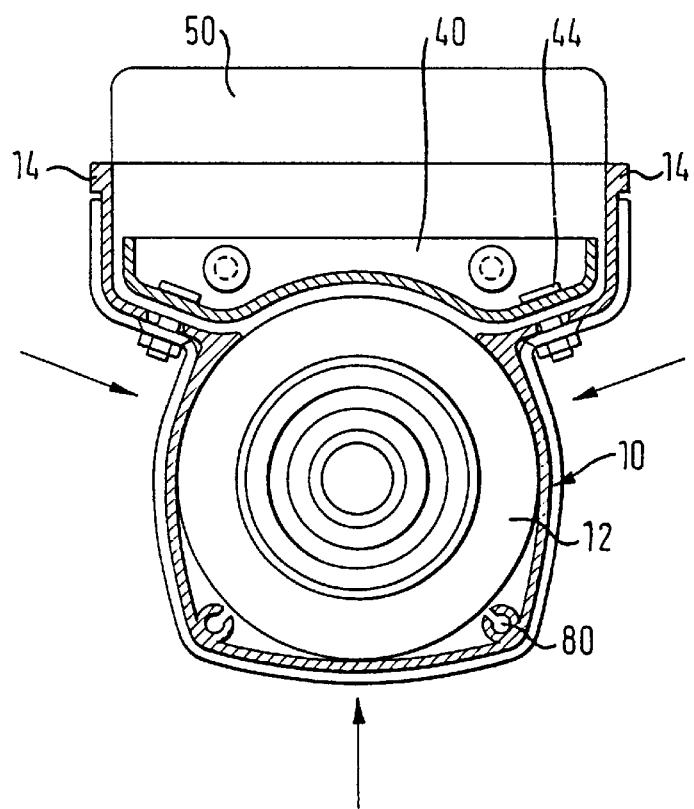
FIG. 13 shows a schematic cross-section through a gas bag restraint module according to the second embodiment with the housing shown in FIG. 12.

The first variant of the housing 10, shown in FIGS. 12 and 13, of the gas bag restraint module in accordance with the second embodiment is provided with two screw eyes 80, which form a single part with the housing 10. This is particularly advantageous if the housing 10 is manufactured from an extruded section. After assembly of the base plate 70 and retaining plate 72, self-tapping screws are inserted into these srcew eyes 80, which together with the attachment bolts 46 secure the base plate 70 and the retaining plate 72.

Figure 14:
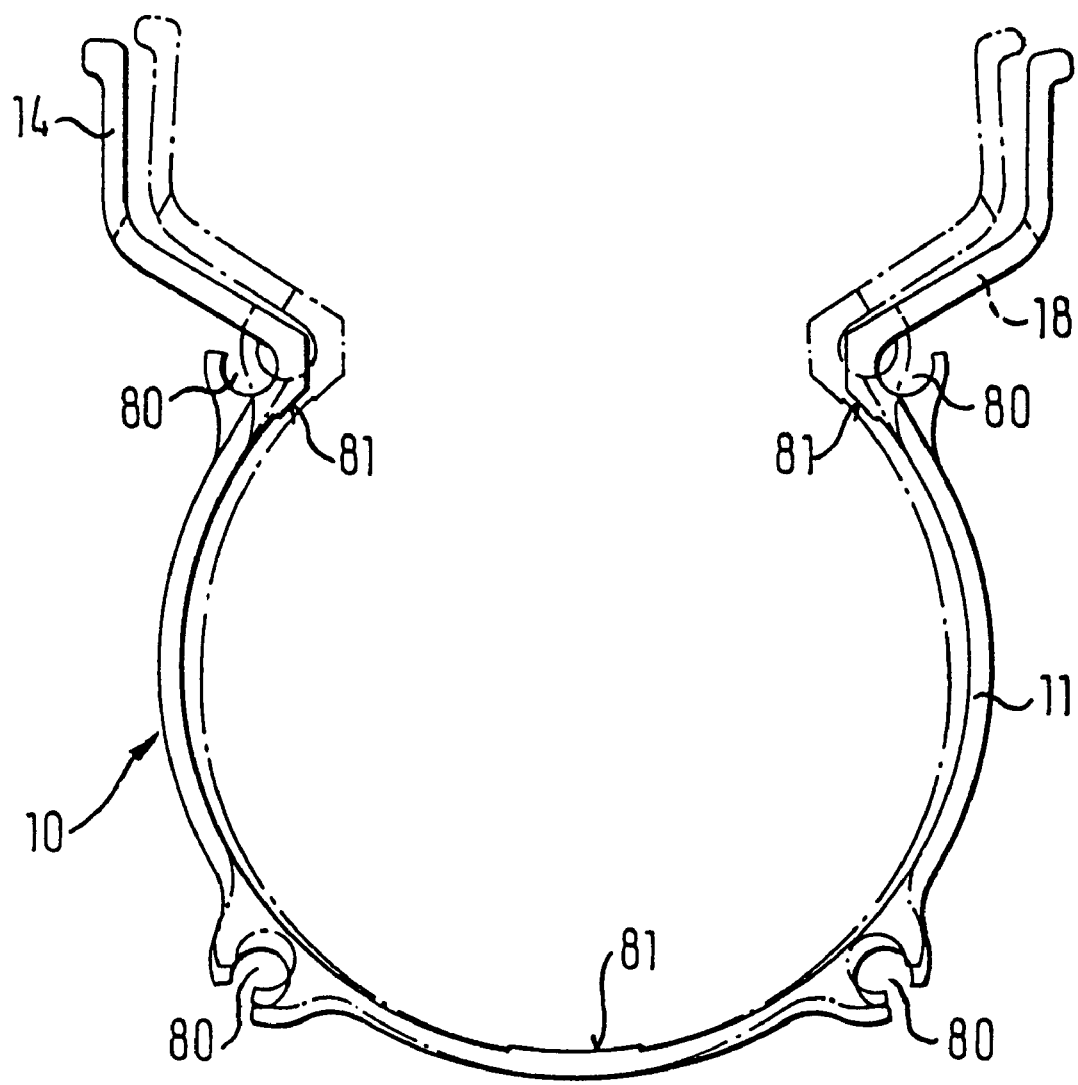
FIG. 14 shows a schematic cross-section through a variant of the housing shown in FIG. 12.

A variant of the housing depicted in FIG. 12 is shown in FIG. 14. The variant according to FIG. 14 differs from the housing according to FIG. 12 by the screw eyes 80 which are now arranged outside the housing instead of being arranged in the interior. In addition, raised abutment surfaces 81 are provided in the interior of the housing. When clamped in the housing 10, the pressurized gas container 12 abuts these abutment surfaces.

FIGS. 15 to 17 show a schematic representation of a gas bag restraint module in accordance with the second embodiment with a second variant of the housing 10. This housing 10 is manufactured from a bent plate component. The improved deformability and machinability of a bent plate component compared with an extruded section result in further structural options for attaching the base plate 70 and the retaining plate 72, as well as for providing the tension between the accommodation part 11 and the pressurized gas source 12. In this variant of the housing 10, the accommodation part 11 is provided with buttresses 90, whose function corresponds to that of the screw eyes 80 shown in FIG. 13. Each buttress is formed from two plates of material 92 and 94 representing the segments of a circle; seen from the direction of the thread they are located one behind the other and in relation to this direction they are bent out of the plane of the material in opposite directions to each other.

FIGS. 18 to 25 show a schematic representation of a gas bag restraint module in accordance with the second embodiment with a third variant of the housing 10. In this variant, the housing 10 is also manufactured from a bent plate component. The accommodation part 11 is fitted with beads 81, with which the pressurized gas source 12 comes into contact when it is clamped in the housing 10. To position the pressurized gas source in relation to the housing, a spacer washer 82 is located at the head end of the pressurized gas source 12, said washer being provided with projections for unequivocal angle positioning in relation to the accommodation part 11 and being held by a clamping effect in the same way as the pressurized gas source 12. This spacer washer stabilizes the accommodation part 11, improves the fixing of the gas bag to the attachment frame 40 and serves as a seal on this side of the pressurized gas source 12.

Instead of using bolts to attach the base plate 70 and the retaining plate 72, bent plates 96 can be used; these are provided for on the front sides of the accommodation part 11, pass through openings 97 formed in the base plate 70 and the retaining plate 72 (refer also to FIG. 22), and are bent over on the outside of the base plate 70 and the retaining plate 72, so that these are fixed firmly in position.

When mounting the second assembly on the first assembly, a deflection plate 98 can be inserted between the attachment frame 40 and the accommodation part 11 in the region of the head end of the pressurized gas source 12. This deflection plate 98 prevents the gas bag 50 from being damaged by the direct flow of pressurized gas released from the pressurized gas source 12.

Figure 18:
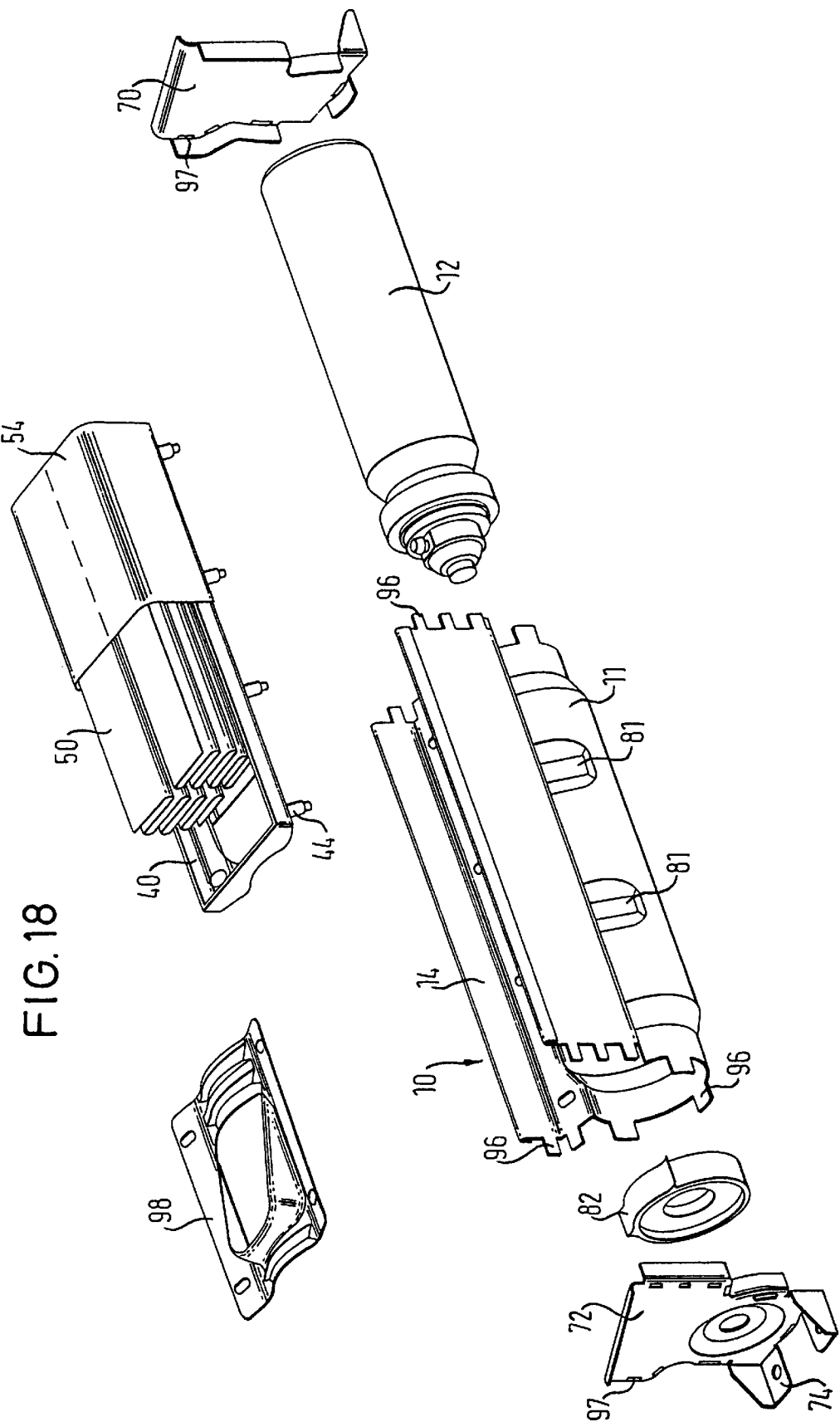
FIG. 18 shows an exploded view of a gas bag restraint module according to the second embodiment with a housing in accordance with a third variant.
Figure 19:
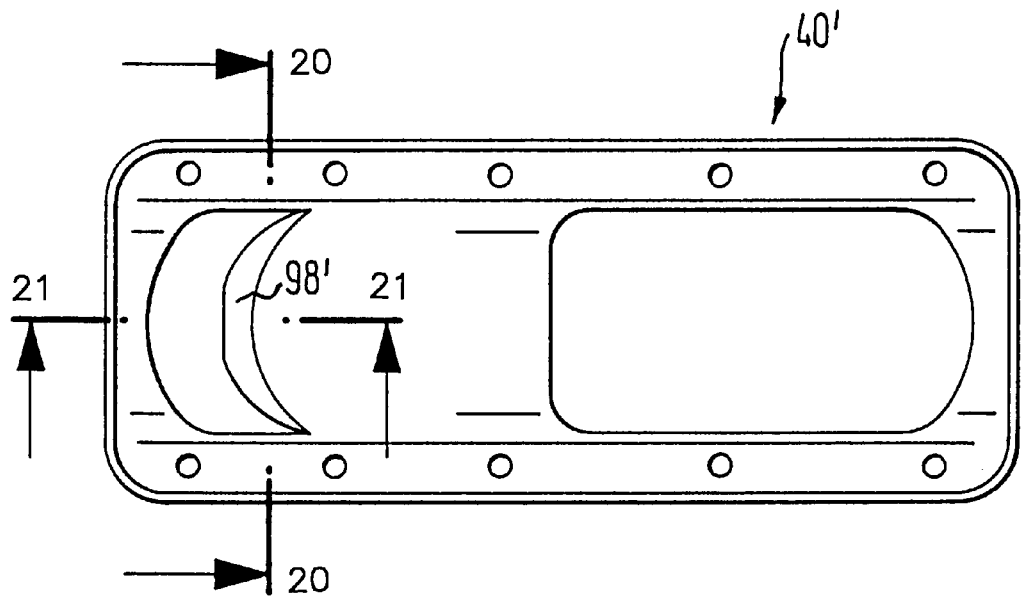
FIG. 19 shows a schematic top view of an attachment frame which can be utilized instead of the attachment frame and the deflection plate of the gas bag restraint module shown in FIG. 18.
Figure 20:
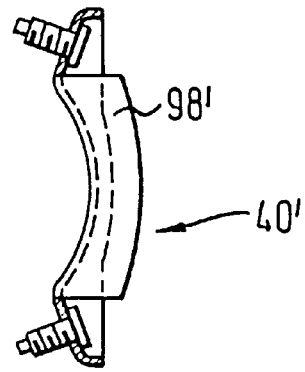
FIG. 20 shows a schematic section along line A-A of FIG. 19.
Figure 21:
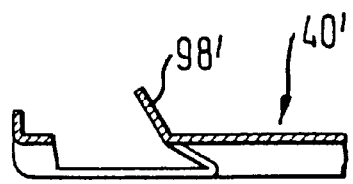
FIG. 21 shows a schematic section along line B—B of FIG. 19.

FIGS. 19 to 21 show a variant which can be utilized instead of the deflection plate 98 and the attachment frame 40 as shown in FIG. 18. According to this variant, the attachment frame 40' is formed integrally with a deflection extension 98'. The deflection extension can also be used for protection the gas bag 50 from being directly subjected to the pressurized gas. Further, the pressurized gas entering the gas bag can be so guided via the particular configuration of the deflection extension 98', its inclination and its length, that the distribution of the gas jet is improved and the gas bag is unfolded in a more symmetric manner and is positioned in front of the vehicle occupant in an improved manner. In addition, uneven loads on the gas bag fabric are avoided.

Figure 22:
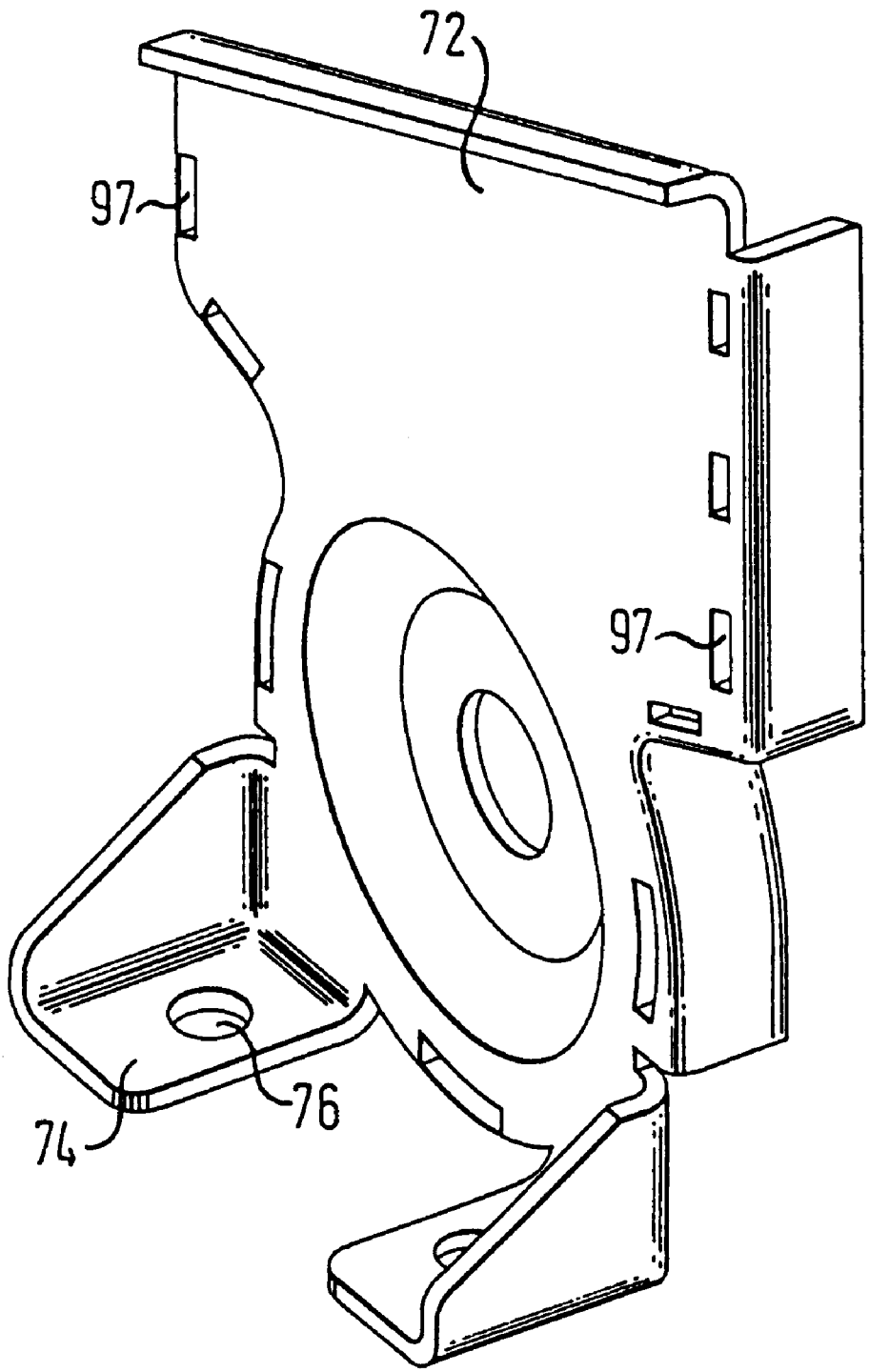
FIG. 22 shows a perspective view of a detail shown in FIG. 18.
Figure 24:
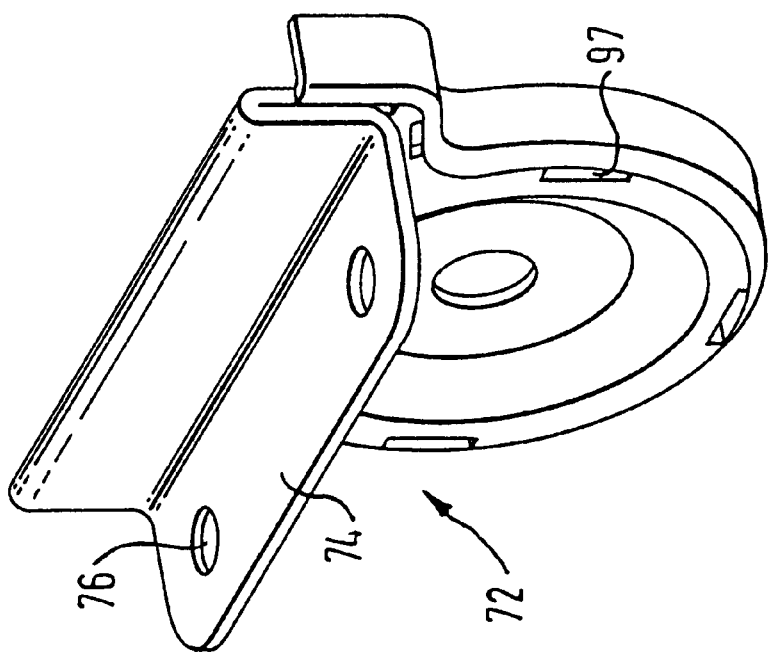
FIG. 24 shows a perspective view of a further variant of a retaining plate which can be utilized instead of the retaining plate of the gas bag restraint module shown in FIG. 18.
Figure 23:
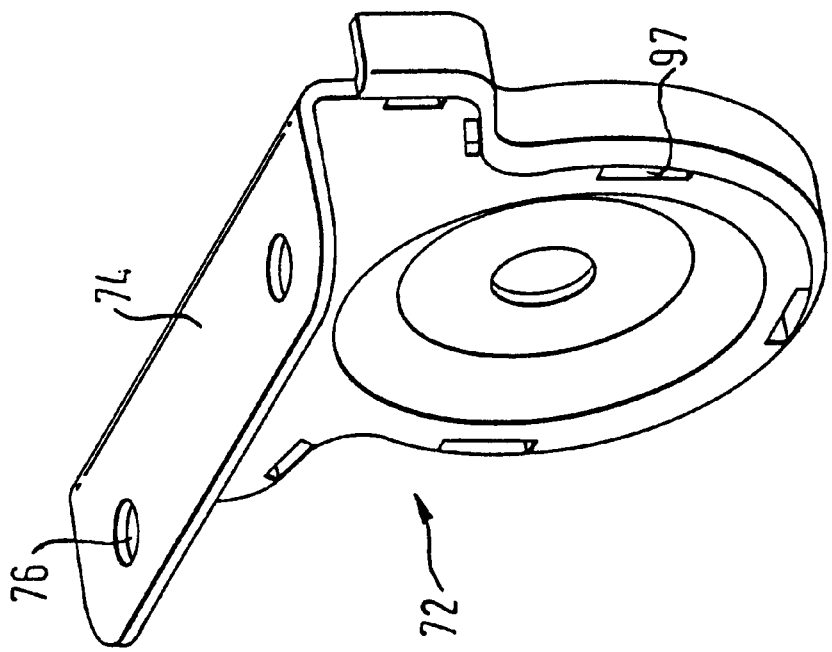
FIG. 23 shows a perspective view of a variant of a retaining plate which can be utilized instead of the retaining plate of the gas bag restraint module shown in FIG. 18.
Figure 25:
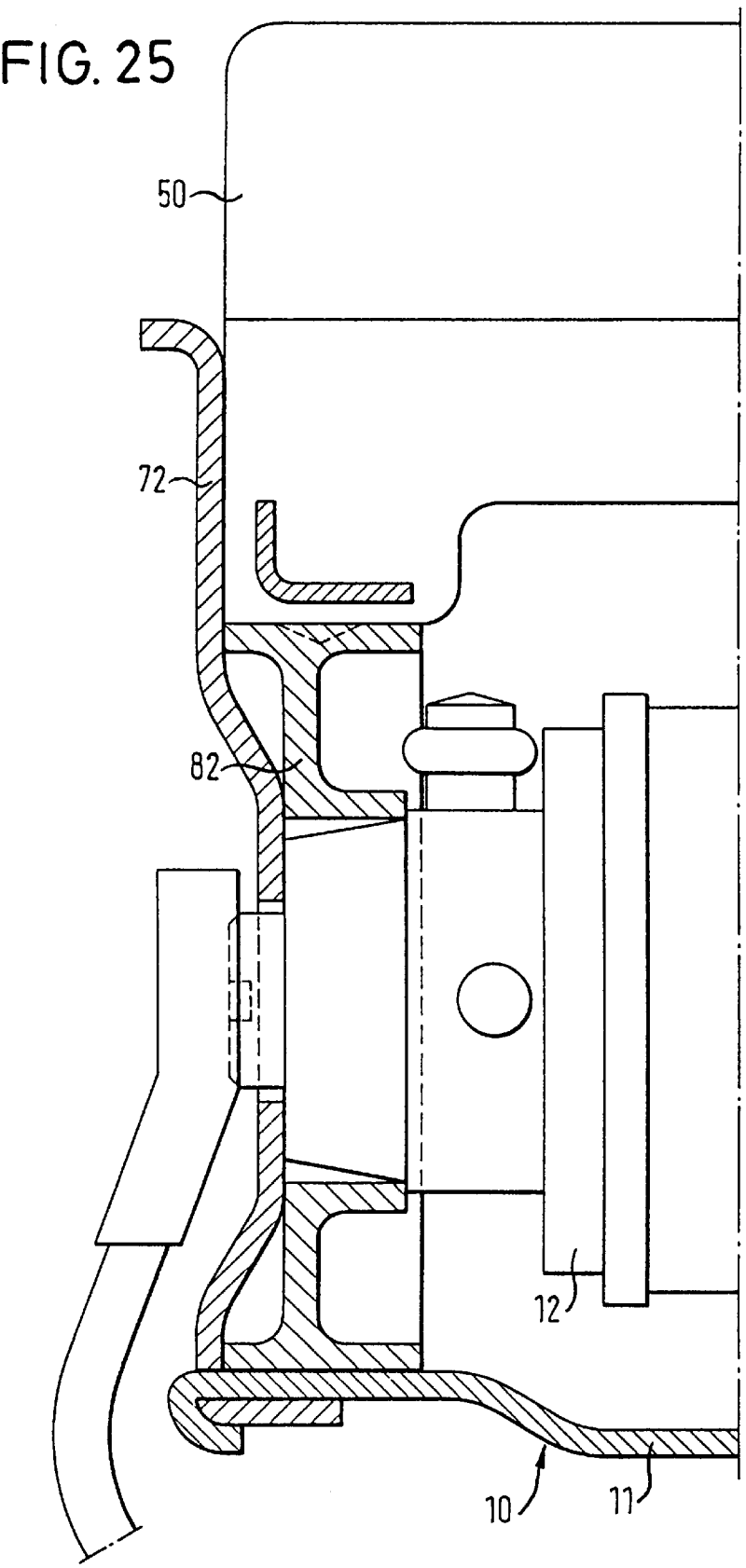
FIG. 25 shows a longitudinal section of a further detail of the housing of the gas bag restraint module shown in FIG. 18.

FIGS. 23 and 24 show a variant of the retaining plate which can be utilized instead of the retaining plate 72 shown in FIGS. 18 and 22. According to this variant, flange 74 for attachment of the gas bag restraint module is not arranged at the bottom side of the retaining plate, but at the upper side. By means of the different configurations, an adaptation to the different situations during installation of the gas bag restraint module in the vehicle is possible.

We claim:

1. A gas bag restraint module, comprising a housing having a generally cylindrical accommodation part and two axially extending attachment strips running outwards from said accommodation part, a bottle-shaped pressurized gas container axially inserted into said accommodation part, said pressurized gas container providing a volume of pressurized gas after activation, and a folded gas bag adapted to be inflated by pressurized gas provided by said pressurized gas container, said gas bag comprising an inflation opening surrounded by an attachment section, said attachment section being provided with an attachment frame comprising at least one through opening which is in fluid communication with said inflation opening, said attachment frame being accommodated between said attachment strips and fixed at said accommodation part.

2. A gas bag restraint module, comprising a housing having a generally trough-shaped accommodation part and two axially extending attachment strips running outwards from said accommodation part, a bottle-shaped pressurized gas container inserted into said accommodation part, said pressurized gas container providing a volume of pressurized gas after activation, and a folded gas bag adapted to be inflated by pressurized gas provided by said pressurized gas container, said gas bag comprising an inflation opening surrounded by an attachment section, said attachment section being provided with an attachment frame comprising at least one through opening which is in fluid communication with said inflation opening, said attachment frame being accommodated between said attachment strips and fixed at said accommodation part.

3. The gas bag restraint module according to claim 1 or claim 2, wherein said accommodation part has a circular cross-section.

4. The gas bag restraint module according to claim 1 or claim 2, wherein said accommodation part has a polygonal cross-section.

5. The gas bag restraint module according to claim 1 or claim 2, wherein said pressurized gas container has a circular cross-section.

6. The gas bag restraint module according to claim 1 or claim 2, wherein said pressurized gas container and said accommodation part are so dimensioned that said pressurized gas container is held in said accommodation part by press fit.

7. The gas bag restraint module according to claim 2, wherein said accommodation part and said attachment frame interact with said pressurized gas container like a pipe clip to produce a clamping effect by means of which said pressurized gas container is held firmly in said accommodation part.

8. The gas bag restraint module according to claim 1 or claim 2, wherein said housing with said pressurized gas container on the one hand and with said attachment frame with said folded gas bag on the other hand form two preassembled assemblies.

9. The gas bag restraint module according to claim 1 or claim 2, wherein said pressurized gas container is provided with a bottom side arranged at an end of said accommodation part, said end being sealed by means of a base plate.

10. The gas bag restraint module according to claim 1 or claim 2, wherein said pressurized gas container is provided with a head arranged at an end of said accommodation part, said end being sealed by means of a retaining plate which is provided with a retaining section adapted to a shape of said head of said pressurized gas cylinder.

11. The gas bag restraint module according to claim 9, wherein said base plate or said retaining plate sealing said end of said accommodation part is bolted to said accommodation part.

12. The gas bag restraint module according to claim 9, wherein said base plate and said retaining plate are provided with a flange for attaching said gas bag restraint module.

13. The gas bag restraint module according to claim 1 or claim 2, wherein said housing is manufactured from an extruded section.

14. The gas bag restraint module according to claim 13, wherein said accommodation part is provided with at least one integrally molded screw eye for a self-tapping screw.

15. The gas bag restraint module according to claim 14, wherein said accommodation part is provided with raised abutment surfaces for said pressurized gas container.

16. The gas bag restraint module according to claim 1 or claim 2, wherein said housing is manufactured from a bent plate component.

17. The gas bag restraint module according to claim 16, wherein said accommodation part is fitted with beads projecting into into said accommodation part.

18. The gas bag restraint module according to claim 11, wherein said accommodation part is provided with at least one buttress for a self-tapping screw and which is formed from two engs of material representing segments of a circle, said engs being, in a longitudinal direction of said screw, located one behind the other and in relation to this direction being bent out of a plane of material in opposite directions to each other.

19. The gas bag restraint module according to claim 9, characterised in that said accommodation part is provided with bent plates at said end, said plates passing through openings formed in said base plate and said retaining plate, and being bent over outside said base plate and said retaining plate.

20. The gas bag restraint module according to claim 9, wherein said attachment frame is provided with attachment bolts which pass through openings formed in said base plate and said retaining plate.

21. The gas bag restraint module according to claim 1 or claim 2, wherein said attachment frame is provided with attachment bolts which pass through openings formed in said attachment section of said gas bag.

22. The gas bag restraint module according to claim 21, wherein said gas bag has an essentially rectangular fixing part provided with a first long side and a second long side and with a middle part arranged between said long sides, said first long side being permanently connected to said gas bag adjacent said attachment section, said middle section adjoining said first long side and being passed over said folded gas bag, and said second long side adjoining said middle section and being arranged opposite said first long side being fixed to said attachment frame by means of projections, which are located along said second long side and which have openings in which some of said attachment bolts project, said middle section being provided with a perforated line which is torn by said gas bag when it unfolds.

23. The gas bag restraint module according to claim 1 or claim 2, wherein said pressurized gas container is provided with a head and wherein a deflection plate is located between said attachment frame and said accommodation part at a side facing said head of said pressurized gas container.

24. The gas bag restraint module according to claim 1 or claim 2, wherein said attachment frame is provided with a deflection extension.

25. The gas bag restraint module according to claim 10, wherein a spacer washer is located between said retaining plate and said pressurized gas source, said washer being provided with projections for unequivocal angle positioning in relation to said accommodation part.

* * * * *